Figure 6:
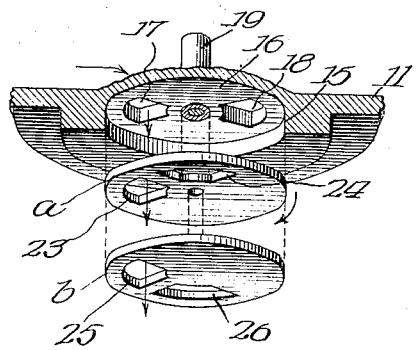

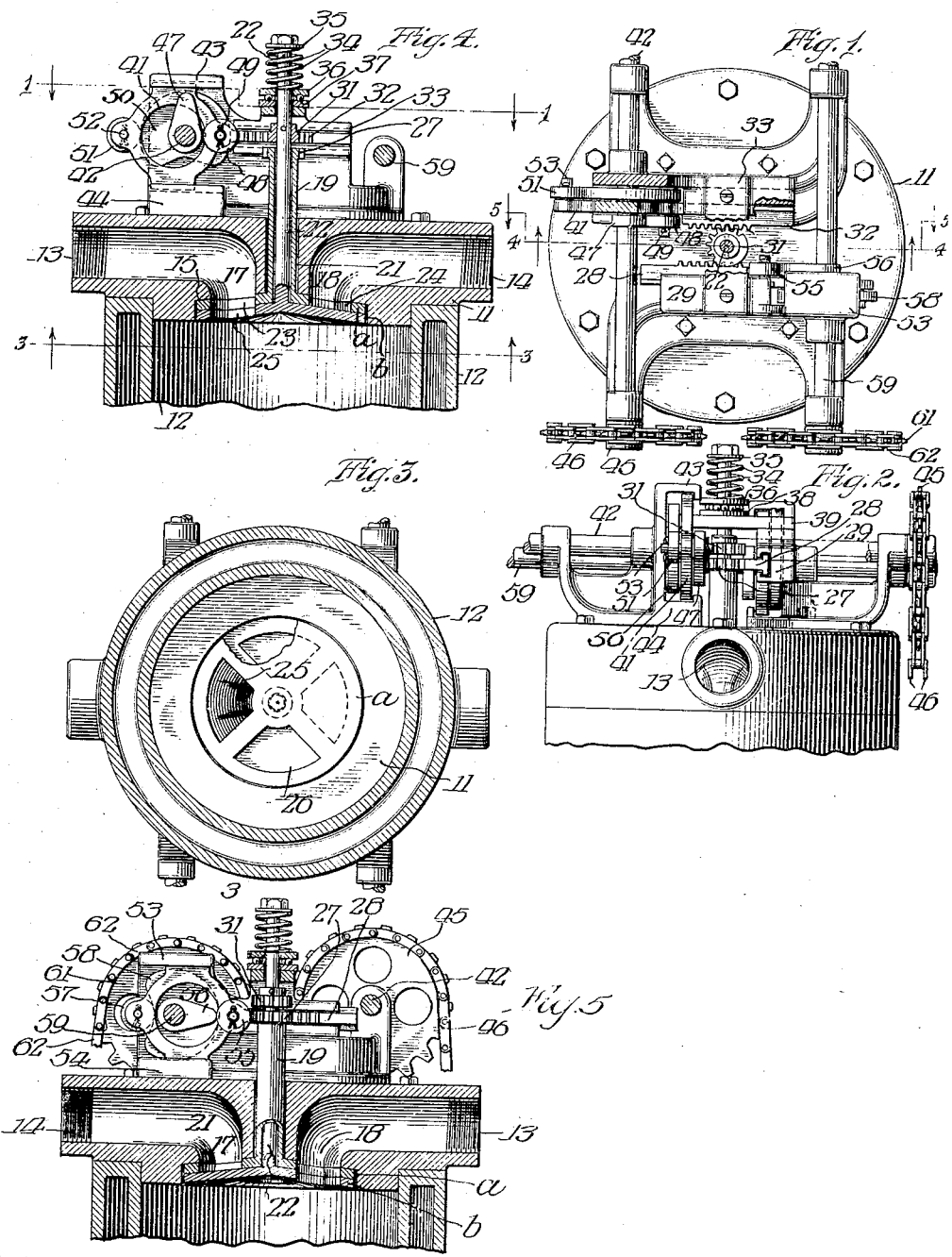

C. L. JOHNSON.
VALVE MECHANISM.
APPLICATION FILED JULY 27, 1914.

1,131,707.

Patented Mar. 16, 1915.
2 SHEETS—SHEET 2.

Witnesses:
W. L. Dow.
A. G. Latimer.

Inventor:
Clinton L. Johnson
By Pond & Wilson
Attys.

UNITED STATES PATENT OFFICE.

CLINTON L. JOHNSON, OF ROCKFORD, ILLINOIS.

VALVE MECHANISM.

1,131,707.     Specification of Letters Patent.     Patented Mar. 16, 1915.

Application filed July 27, 1914. Serial No. 853,424.

*To all whom it may concern:*

Be it known that I, CLINTON L. JOHNSON, a citizen of the United States, residing at Rockford, in the county of Winnebago and State of Illinois, have invented certain new and useful Improvements in Valve Mechanism, of which the following is a specification.

This invention, while pertaining to valves in general, relates more particularly to the inlet and exhaust valves of a gas engine, and to the mechanism for operating the same. The ordinary reciprocating or puppet valves, which are customarily used on gas engines, are open to the objection that the gases pass directly across the faces of the valves and across the faces of the seats, with the result that the valves and seats become burned and pitted, and also collect on their working surfaces quantities of carbon and other deposits which are packed in position by repeated impacts of the valves against their seats, and are burned onto the surfaces so that the valves are prevented from seating properly. The sliding or ring valves, commonly known as the "Knight" valves, are also prone to cake with carbon deposits which seriously interfere with the proper working of the valves and with the efficiency of the engine. Furthermore, in these valves the rings are constantly moving, so that an accurate fit between two sliding surfaces must be relied upon to prevent leakage during the compression stroke. The result of this construction is that slight wearing of the contacting sliding surfaces will cause leakage. The other types of continuously rotating valves which have been used to a limited extent are also open to the same objections as above noted in connection with the sliding valves.

My present invention is designed to provide a valve which will embody in one structure both the intake and exhaust valve, and which will overcome the objectionable features of the other types of valves now in use.

With this end in view I have devised a valve, one of the primary objects of which is an intermittent oscillatory movement which will cause the valves to grind their own seats, thereby reducing the liability of leakage to a minimum.

Another object of the invention is the provision of a valve mechanism in which both the intake and exhaust valves will be stationary during the compression and firing strokes, thereby eliminating friction and the liability of leakage which occurs in valves of the continuously moving type.

A further object of the invention is to provide a valve structure which will utilize the pressure in the cylinders to maintain the valves properly seated during the compression and firing strokes.

Another object is the provision of novel mechanism for operating the valves, so that the inlet port will be open during the whole intake stroke, and the outlet port will be open during the whole exhaust stroke, while both ports will be closed and the valves will be stationary during the compression and firing strokes.

Still another object is to provide valve operating mechanism which will be positive and accurate in operation, eliminating from its construction all springs, together with the attendant uncertainties in operation resulting from their use.

For the purpose of facilitating an understanding of my invention, I have illustrated on the accompanying drawings one preferred embodiment thereof, from which, when considered in connection with the following description, the principle of my invention should be readily understood.

Figure 7:
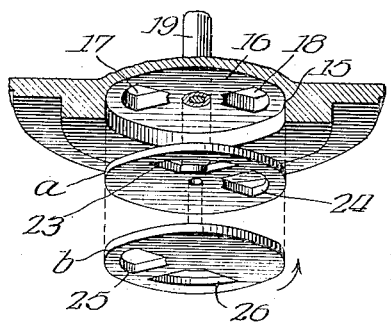
Figure 8:
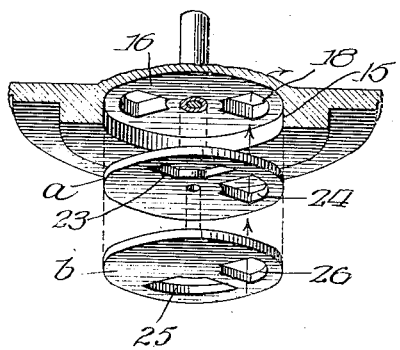

Referring to the drawings: Figure 1 is a plan view of a cylinder head equipped with my invention, this view being taken on the line 1—1 of Fig. 4. Fig. 2 is an elevation looking at one side of the structure shown in Fig. 1. Fig. 3 is a sectional view on the line 3—3 of Fig. 4. Fig. 4 is a sectional view on the line 4—4 of Fig. 1. Fig. 5 is a similar view on the line 5—5 of Fig. 1. Fig. 6 is a perspective view showing the valve disks as drawn downwardly from the cylinder head, and showing the position of the parts during the intake stroke. Fig. 7 is a similar view showing the position of the parts during the compression and firing strokes, and Fig. 8 is a similar view showing the position of the parts during the exhaust stroke.

On the drawings reference character 11 indicates a cylinder head of the general type known as a "T-head" motor, the cylinder walls 12, being of any preferred construction. The head 11 is provided with the usual intake passage 13, and exhaust passage 14.

The valves proper, which I will designate as *a* and *b* respectively, are of disk shape, adapted to be disposed and operate in a deep cushion or recess 15, formed in the lower face of the cylinder head, the bottom of the recess being machined to provide a bearing face 16 provided with inlet and exhaust ports 17 and 18 opening into the intake and exhaust passages 13 and 14 respectively. In order to assist in centering the valve *a* and to decrease the liability of carbon or other deposits sticking to the valve seat, I prefer to make the seat tapered or of cone shape, as is best shown in Figs. 4 and 5.

The upper face of valve *a* is shaped to fit the seat 16, and its lower face is correspondingly coned to afford an inclined seat for the valve *b*. The valve stem 19 of valve *a* projects upwardly through a suitable bearing opening 21 in the cylinder head, and is made hollow to accommodate the stem 22 of valve *b*, which projects upwardly therethrough. The lower face of valve *b* is also preferably conical in shape, to present a maximum surface to the pressure within the cylinder, which serves to hold both valves against their seats, thereby preventing leakage.

The disk portions of the valves *a* and *b* are substantially identical, the valve *a* being provided with inlet and outlet ports 23 and 24, and the disk *b* being provided with inlet and outlet ports 25 and 26. When the valves are in their normal or closed positions during the compression and firing strokes, the port 24 is in alinement with port 18, and port 25 is in alinement with port 17. Port 17, however, is closed by the solid portion of valve *a*, and port 24 is closed by the solid portion of valve *b*, all as shown in Fig. 7. Just prior to the suction stroke the valve disks *a* and *b* are in the positions shown in Fig. 7 in which both of the fixed ports 17 and 18 are blanked. During the first half of the suction stroke the disk *a* is turned counter-clockwise through a quarter turn, bringing port 23 into full registration with ports 17 and 25 as shown in Fig. 6. During the last half of the suction stroke, the disk *a* is turned clockwise back to its former position shown in Fig. 7, so that at the end of the suction stroke both ports 17 and 18 are blanked. During the compression and firing strokes both disks remain stationary in the position shown in Fig. 7. During the first half of the exhaust stroke the disk *b* is turned counter clock-wise through a quarter turn, bringing port 26 into full registration with ports 18 and 24, as shown in Fig. 8; and during the last half of the exhaust stroke the disk *b* is turned clock-wise back into its former position shown in Fig. 7, thus completing the cycle. It will thus be seen that the disks *a* and *b* oscillate alternately through a quarter circle to perform the intake and exhaust functions of the engine, respectively; each to-and-fro oscillation occurring during one-fourth of the engine cycle.

The mechanism for operating the valves in the manner above described comprises a pair of reciprocatory cam-actuated rack-bars meshing with pinions mounted on the respective valve stems, as will now be described. The upper end of valve stem 19 is equipped with a pinion 27, meshing with a rack-bar 28, mounted to reciprocate in a suitable guide-way 29. A similar pinion 31, fixed on the valve stem 22, is adapted to mesh with a similar rack-bar 32, mounted to reciprocate in a suitable guide-way 33. The valves are maintained in operative position with their pinions meshing with their respective rack-bars, by means of a coiled expansion spring 34, bearing, at its opposite ends respectively, against a washer 35, on the upper end of the stem 22, and a ball-race member 36, supported through the intermediary of balls 37 and a companion race member 38, from a rigid cross-bar 39.

The rack-bar 32, as will be evident from Fig. 4, is shaped at one end to provide an enlarged opening 41, which if preferred may be in the shape of an elongated slot through which the inner end of a cam-shaft 42 projects. The horizontal dimensions of the opening or slot are proportional to permit reciprocation of the rack-bar without interfering with the cam-shaft 42 which projects therethrough. The rack-bar is further guided in its reciprocatory movements by the upper and lower guide-ways 43 and 44 in which the upper and lower flattened portions of the enlarged end of the rack-bar travel. The shaft 42, which is mounted in suitable brackets on the cylinder head, is continuously rotated by any suitable mechanism, and preferably is equipped with a sprocket wheel 45 adapted to be driven from any suitable source by a drive chain 46.

Upon the cam-shaft 42 there is fixedly secured, as shown in Fig. 4, a sharp cam 47, adapted to coöperate with a follower 48, carried by a pin 49, projecting laterally from the rack-bar. A complementary cam 50 fixed on the shaft 42 at the opposite side of the rack-bar, is adapted to coöperate with a follower 51 carried by a pin 52, projecting in the opposite direction from the rack-bar head, to positively move the rack-bar in the opposite direction from that in which it is moved by the cam 47. The cam 50 is concentric throughout a major portion of its periphery, so that it will hold the rack-bar and consequently the valve *b* stationary during three strokes of the engine piston, and the cam 47 had a sharp, short riser portion which opens the valve during the first half of the exhaust stroke, and said valve is closed during the last half of the exhaust stroke by the active side of the cam 50. It will thus be manifest that the valve *b* is positively opened by the cam 47, and positively closed by the cam 50, with the result that its opening and closing movements are positively and accurately controlled, as distinguished from the yielding and uncertain action of spring-closed valves. The valve disks themselves, while shown on the drawings as being somewhat smaller in diameter than the cylinder head, may in actual practice be substantially of the same diameter as the cylinder, if preferred, and while the cylinder head is shown as having a machined depression of sufficient depth to accommodate both valve disks, the disks may in some instances be disposed beneath the head within the body of the cylinder. In other words the depth of the depression may be varied within wide limits. When the disks are set wholly within the depression as shown in Fig. 4 sufficient clearance should be left between the peripheries of the disks and the vertical walls of the depression to take care of expansion of the disks and head and prevent sticking of the valves.

The rack bar 28, which actuates the valve *a*, is constructed substantially identical with the rack bar 32 and is guided in the guideways 53 and 54 and equipped with a cam-follower 55 adapted to be actuated by sharp cam 56, and with a follower 57 adapted to be actuated by the complementary cam 58. Cams 56 and 58 are mounted on a cam shaft 59 driven by a sprocket wheel 61 through a chain 62. All of the mechanism for operating the valve *a* is substantially identical with that which operates valve *b*. The cam 56 opens the valve *a* during the first half of the suction stroke, and said valve is closed during the last half of the suction stroke by the active side of the cam 58. Figs. 4 and 5 illustrate the relative positions of the valve disks and of their operating cams at the middle of the suction stroke of the engine piston.

From the foregoing it will be apparent that the several ports controlling the intake and exhaust are in full registration, and consequently the intake and exhaust passages are at their maximum cross-sectional area, at mid-stroke of the engine piston when the volume of fluid flowing through said ports is at its maximum; the cross-sectional area being at its minimum during the initial and final parts of the stroke when the fluid displacement is least.

The cam shafts 42 and 59 will extend across the heads of all the cylinders of the engine so that the valves of all the cylinders will be operated from these shafts. The timing of the valves of the various cylinders will be determined by the position of the various cams on the shafts which cams should be properly adjusted the same as they must be on any gas engine.

It will be manifest from the foregoing that when the engine is in operation each valve disk will oscillate through an arc of approximately 90 degrees through its opening and closing movements and that both valves remain stationary during the compression and firing strokes. It will also be obvious that each of the valve disks grinds its own seat and that the valves are held against their seats by the pressure within the cylinder so that there is little possibility of leakage. Furthermore, since the valves are stationary during the compression and firing strokes the friction and consequent wear on the valves will be much less than it is on valves which are moving under pressure, that is, valves which are acted upon by the pressure within the cylinder during their movement.

Many other advantages and desirable features of my improved valve mechanism will be apparent to those skilled in the art in addition to those above numerated and in addition to the fact that the valves are positively and accurately operated and that no reliance is placed upon springs or other uncertain mechanical elements. It should also be understood that my invention is capable of considerable modification in its structural details without departing from the scope of the invention as set forth in the following claims.

I claim:

1. In a valve mechanism for gas engines, the combination of a plurality of valve disks each provided with an inlet and an exhaust port, and means for controlling said disks so that they both remain stationary during the compression and firing strokes and are moved to aline the inlet and exhaust ports during the inlet and exhaust strokes respectively.

2. In a valve mechanism for gas engines, the combination of a plurality of concentrically mounted oscillatory valve disks, each provided with an inlet and an exhaust port, means for maintaining said disks stationary and in closed position during the compression and firing strokes of the engine, and means for moving said disks to open the inlet and exhaust ports at predetermined intervals.

3. In a valve mechanism for gas engines, the combination of a plurality of valve disks concentrically mounted, one above the other, each of said disks being provided with an inlet and an exhaust port, and means for oscillating said disks alternately and in the same directions, said disks being positioned to be held against their seats by the pressure in the engine cylinder.

4. A valve mechanism comprising a plurality of concentrically arranged valve disks each provided with an inlet and an exhaust port, means for alternately oscillating said disks, and means including a spring for yieldingly maintaining said valves against their respective seats.

5. In a valve mechanism, the combination of a plurality of concentrically mounted valve disks, pinions mounted on the valve stems, a rack bar meshing with each pinion, and means for positively reciprocating said rack bars to oscillate said valves in predetermined timed relation.

6. In a valve mechanism, the combination of a plurality of concentrically mounted valve disks provided with inlet and exhaust ports and having valve stems projecting upwardly through the head of a cylinder, rack bars meshing with pinions on said stems, and means including a plurality of positively actuated cams for reciprocating said rack bars to open and close said inlet and exhaust ports.

7. In a valve mechanism, the combination of an oscillatory valve comprising a valve disk and a stem, a pinion on said stem, a rack bar meshing with said pinion, cam followers carried by said rack bar, a cam shaft, and a plurality of cams mounted on said shaft to coöperate with said followers whereby the rack bar is positively actuated in both directions to oscillate said valve.

8. In a valve mechanism, the combination of a valve comprising a disk and an integral valve stem rotatably mounted, a reciprocatory rack bar having a toothed connection with said stem, a cam shaft, and cam connections between said shaft and said rack bar whereby the rack bar is intermittently reciprocated upon rotation of said shaft.

9. In a valve mechanism, the combination of a plurality of valve disks mounted to oscillate concentrically, a plurality of cam shafts, and means connecting said shafts with said valve disks whereby the disks are positively oscillated in alternating relation.

10. In a valve mechanism, the combination of a plurality of rotatably mounted concentrically disposed valve disks, a reciprocatory rack bar connected with each disk, and means for positively reciprocating said rack bars to oscillate said valves alternately at predetermined intervals.

11. In a valve mechanism for gas engines, the combination with a valve seat having inlet and exhaust ports, of a pair of superposed valves each having a pair of ports, one of said ports controlling the inlet and the other the exhaust functions of the mechanism, means for moving one of said valves during the intake stroke, and means for moving the other valve during the exhaust stroke, both of said valves remaining stationary during the compression and firing strokes.

12. In a valve mechanism for gas engines, the combination with a circular valve seat having inlet and exhaust ports, of a pair of superposed disk valves each having a pair of ports, one of said valves controlling the inlet and the other the exhaust functions of the mechanism, means for turning one of said valves during the intake stroke, and means for turning the other valve during the exhaust stroke, both of said valves remaining stationary during the compression and firing strokes.

13. In a valve mechanism for gas engines, the combination with a circular valve seat having diametrically opposed inlet and exhaust ports, of a pair of superposed disk valves each having a pair of ports set quartering, one of said valves controlling the inlet and the other the exhaust functions of the mechanism, positively actuated means for oscillating one of said valves through a quarter turn during the intake stroke, and for oscillating the other valve through a quarter turn during the exhaust stroke, both of said valves remaining stationary during the compression and firing strokes.

14. In a valve mechanism for gas engines, the combination with a port communicating with an engine cylinder, of a valve movable with respect to the port for closing and opening the same, and means for operating said valve comprising a member connected with the valve and being provided with a pair of spaced cam followers, a cam for operating one of the followers to move the valve to open the port, and a cam for operating the other follower to move the valve to close the port and for holding the valve stationary in its port-closing position.

15. In a valve mechanism for gas engines, the combination with a port communicating with an engine cylinder, of a valve movable with respect to the port for closing and opening the same, and means for operating said valve comprising a member connected with the valve and being movable reciprocably for moving the valve to close and open the port, a pair of continuously rotating cams, one of said cams being arranged to move said member and the valve to open the port and the other cam being arranged to move said member and valve to close the port and to hold the valve stationary in its port-closing position during the compression and firing strokes.

CLINTON L. JOHNSON.

Witnesses:
JOHN H. McCANNA,
E. M. ST. JOHN.